United States Patent

[11] 3,620,273

[72] Inventor Robert L. Propst
2347 Londonderry Ave., Ann Arbor, Mich. 48170
[21] Appl. No. 40,162
[22] Filed May 25, 1970
[45] Patented Nov. 16, 1971

[54] TREE HARVESTING APPARATUS
10 Claims, 4 Drawing Figs.

[52] U.S. Cl. .................................................. 144/3 D, 144/2 Z
[51] Int. Cl. .................................................. A01g 23/02
[50] Field of Search .................................. 144/2 Z, 3 D, 34 R, 34 E, 309 AC

[56] References Cited
UNITED STATES PATENTS
3,140,736 7/1964 Propst .......................... 144/3 D
3,348,592 10/1967 Winblad et al. ................ 144/3 D
3,557,849 1/1971 Martinson ..................... 144/3 D Primary Examiner—Gerald A. Dost
Attorney—Olsen and Stephenson ABSTRACT: Apparatus for harvesting trees comprising a forwardly movable vehicle having a tree felling and processing assembly mounted on the front end thereof and adjustable in a direction transversely of the direction of movement of the vehicle to enable accurate alignment of the assembly with a tree selected for harvesting during movement of the vehicle. The felling and processing assembly includes a lower severing mechanism and a mast which extends upwardly therefrom and is movable between vertical and inclined positions. The assembly also includes a tree gripping and feeding assembly consisting of pairs of elongated concave surfaced rollers which grip the tree and are operable to feed the tree downwardly so that it can be cut off into lengths. The tree lengths are then bucked onto a conveyor which moves them to a storage receptacle on the vehicle.

PATENTED NOV 16 1971

INVENTOR
ROBERT L. PROPST

BY *Olsen and Stephenson*

ATTORNEYS

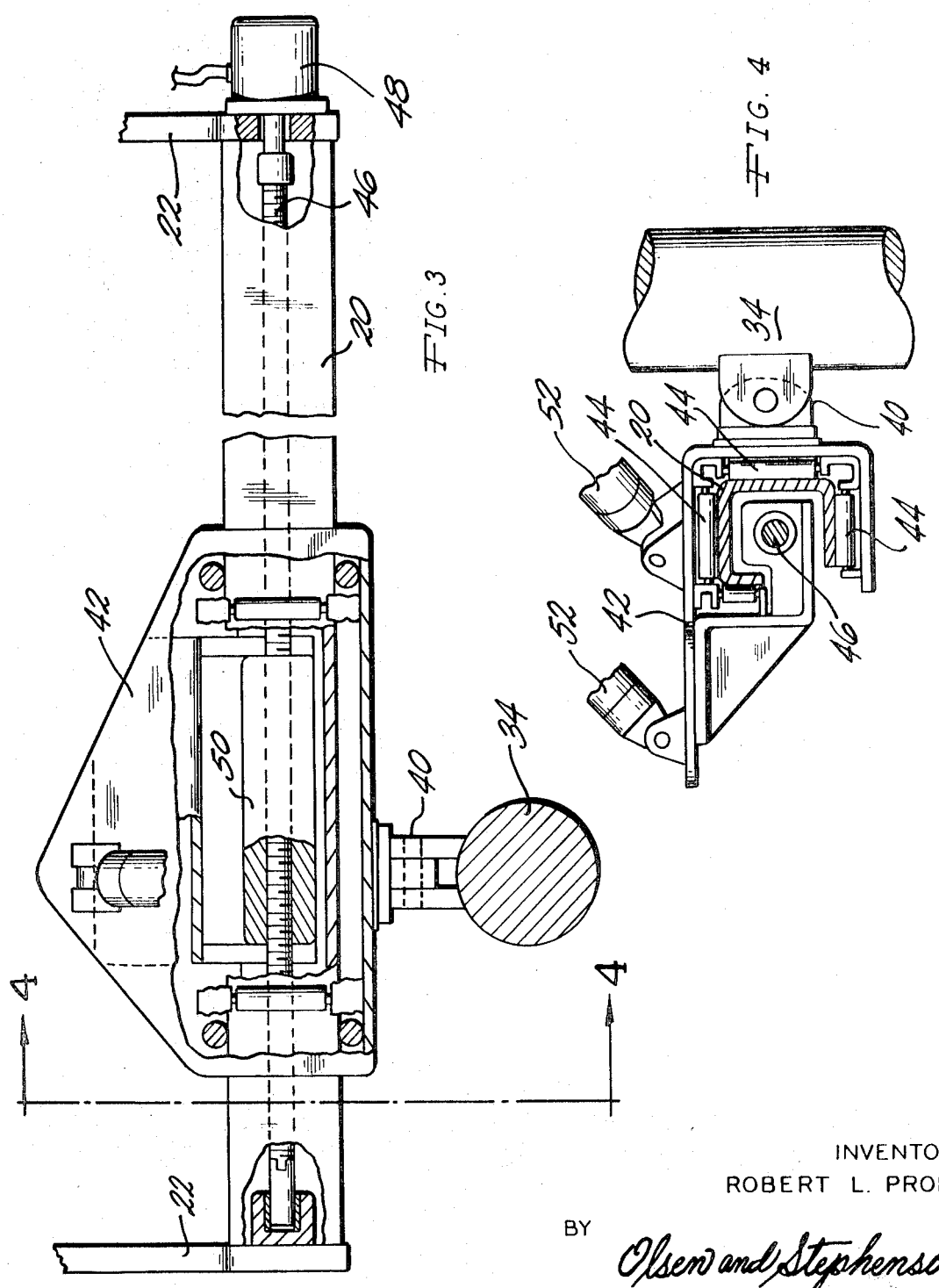

TREE HARVESTING APPARATUS

CROSS REFERENCE TO COPENDING APPLICATION

The tree-harvesting apparatus of this invention is disclosed in my prior copending application Ser. No. 29,109 filed Apr. 16, 1970.

BACKGROUND OF THE INVENTION

Prior tree harvesting concepts have required the moving of apparatus up to a tree, stopping the apparatus while the felling operation is being accomplished, and then moving either a full-tree length or cut-up portions of the tree into storage positions. This stopping requires a judgement decision on the part of the operator on when to stop the apparatus and another judgement decision on when to start the apparatus moving after the felling has been completed. Both judgement decisions involve delay which significantly affects production capabilities and costs. My prior U.S. Pat. No. 3,140,736 illustrates timber harvesting apparatus operated in this manner. The present invention is an improvement on the apparatus illustrated in the aforementioned patent.

SUMMARY OF THE INVENTION

The present invention consists of a forwardly moving vehicle equipped on its forward end with an adjustable tree felling and processing assembly. A horizontal frame member is mounted on the front end of the vehicle so that it extends transversely of the direction of vehicle movement and the tree felling and processing assembly is mounted on the frame member so that it can be moved to adjusted positions transversely of the vehicle. This enables the operator of the vehicle to combine movement of the vehicle with adjustable movement of the felling and processing assembly to align the assembly with a tree in the woods which has been selected for harvesting. The assembly includes a lower C-frame on which a tree severing element is mounted for engagement with the selected tree to sever it from its base. An upright mast on the C-frame is vertically aligned with the tree concurrently with the severing operation and a tree gripping and feeding assembly mounted on the mast and consisting of pairs of elongated concave surfaced rollers are operable to grip the tree and feed it downwardly, a cutoff mechanism cuts off the downwardly moving tree into predetermined lengths and a tree-bucking member moves the cutoff lengths onto a conveyor on the vehicle which moves the lengths to stored positions on the vehicle. During downward movement of the tree, a tree delimbing assembly functions to remove unwanted limbs from the tree. The apparatus of this invention is thus operable to provide for fast and economical harvesting of trees.

Further objects, features and advantages of this invention will become apparent from a consideration of the following description, the appended claims, and the accompanying drawing in which:

FIG. 3 is an enlarged fragmentary top view of the front end portion of the apparatus of FIG. 1 with some parts broken away and other parts shown in section for the purpose of clarity; and FIG. 4 is a fragmentary sectional view of a portion of the apparatus of this invention as seen from substantially the line 4—4 in FIG. 3.

Figure 1:
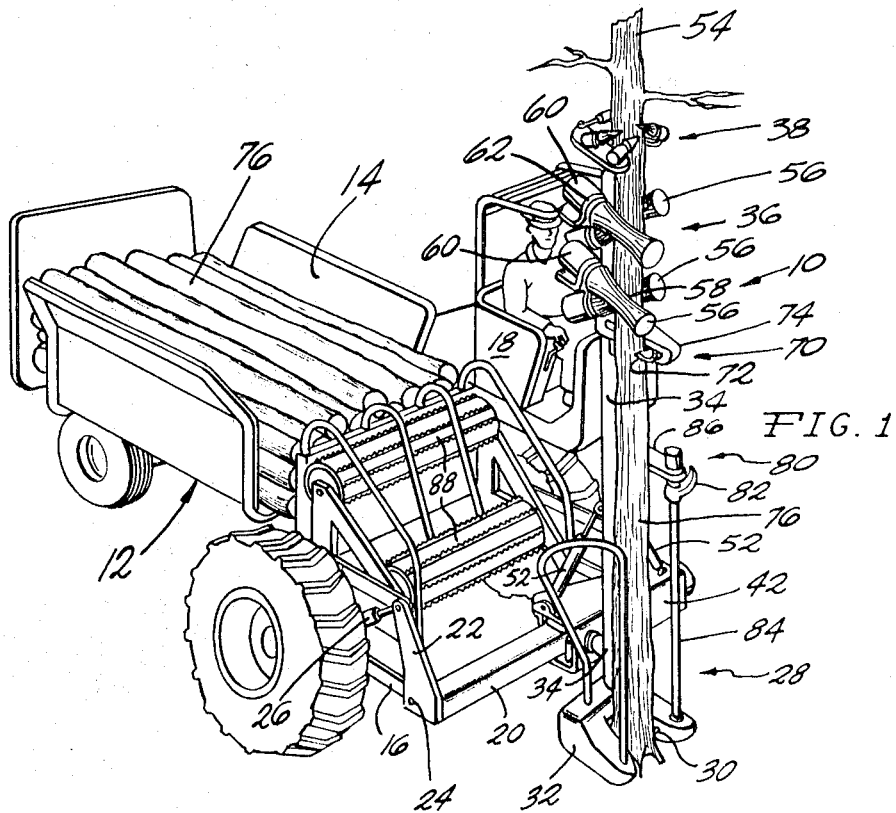
FIG. 1 is a perspective view of the harvesting apparatus of this invention shown in position to harvest a tree.

With reference to the drawing, the apparatus of this invention, indicated generally at 10, is illustrated in FIG. 1 as including a forwardly movable vehicle 12 having a log storage box 14 mounted thereon and having a front end 16. The vehicle 12 also includes a cab 18 located at the front end of the vehicle at an elevated position from which the vehicle operator can steer the vehicle 12 and manipulate other components of the apparatus 10 with good visibility of tree harvesting operations. A substantially horizontal transversely extending hollow frame member 20 is mounted at the front end 16 of the vehicle 12 on rocker arms 22 supported on pivots 24 on the main frame of the vehicle 12. Hydraulic cylinder assemblies 26 on the vehicle main frame are connected to the rocker arms 22 and are operable on extension and retraction to raise and lower the frame member 20 relative to the ground surface over which the vehicle 12 is traveling.

A tree felling and processing assembly 28 is located forwardly of the frame member 20 and consists of a movable tree severing element 30 mounted on a C-frame 32 and explained in detail in the aforementioned application, an upright mast 34 which extends upwardly from the C-frame 32, a tree gripping and feeding assembly 36 and a delimbing assembly 38. A pivot assembly 40, secured to the mast 34 at a position adjacent the C-frame 32, extends rearwardly from the mast 34 and is pivotally supported on a slide assembly 42 supported on rollers 44 (FIG. 4) supported on the frame member 20. Thus, the slide assembly 42 is movable longitudinally of the frame member 20 and the rollers 44 facilitate such movement.

An elongated threaded shaft, or screw member 46, is supported on and extends longitudinally through the frame member 20. A reversible motor 48 connected to the screw member 46 is operable to rotate the screw member when desired. A large nut member 50, which forms a part of the slide assembly 42, is threadably connected to the screw member 46 and as a result, in response to rotation of the screw member 46 in either direction by the motor 48, the nut member 50, and thus the slide member 42, are moved longitudinally of the frame member 20.

A pair of hydraulic cylinder assemblies 52 are mounted on the slide assembly 42 and connected to the mast 34. The assemblies 52 can be relatively extended and retracted so as to incline the mast 34 relative to a vertical plane while still maintaining the mast 34 in a generally upright position. This enables manipulation of the tree gripping and feeding assembly to engage a tree, like the tree 54 shown in FIG. 1, which is not disposed in a vertical plane.

The tree gripping and feeding assembly 36 consists of a plurality of rollers 56 arranged in cooperating horizontally spaced pairs, two of which pairs are included in the assembly 36 illustrated in FIG. 1. Each roller 56 is of generally elongated cylindrical shape having a continuous concave surface 58. Since each pair of rollers 56 are identical and operate in the same manner, only one pair of rollers will be described in detail hereinafter. A drive motor 60 is associated with each roller 56 for continuously rotating the roller about its axis and each roller is mounted on a supporting plate 62. The supporting plates 62 are in turn mounted for back and forth swinging movement about horizontal supporting pivots carried by a mounting plate 64 secured to the mast 34. As a result, each pair of rollers 56 is movable about the pivots therefor between moved-apart released positions illustrated in broken lines in FIG. 2 and moved-together tree-gripping positions illustrated in solid lines in FIG. 2, such movement being accomplished in the case of each roller by a hydraulic cylinder assembly 66 pivotally connected between the mounting plate 64 and the supporting plate 62 for the roller 56. The hydraulic cylinder assemblies 66 are operated so that there is continuous hydraulic pressure in each cylinder assembly 66 in the gripping positions of the rollers 56 illustrated in FIG. 2. Also, as shown in FIG. 1, the rollers 56 in each pair are arranged crisscross fashion, namely, their longitudinal axes are relatively reversely inclined. This arrangement enables manipulation of the rollers to grip trees of a wide range of size without danger that the rollers 56 in a pair will engage each other before gripping the tree. The concave surface configurations of the rollers facilitates their frictional engagement with opposite sides of the tree 54 and the maintenance of hydraulic pressure in the hydraulic cylinder assembly 66 provides for continuous engagement of the roller surface 58 with the tree 54 to accommodate minor variations in the thickness of the tree 54. The rollers 56 in each pair are rotated in relatively opposite directions so that they operate to feed the tree 54 downwardly. Such downward movement of the tree 54 moves the tree progressively past delimbing assembly 38 which is positioned on the mast 34 above the feeding and gripping assembly 36 and is described in detail in the aforementioned application.

A tree severing mechanism 70 positioned below the feeding and gripping assembly 36 consists of a chain drive saw 72 mounted on a support 74 secured to the mast 34 and extending transversely therefrom. A drive motor associated with the saw 72 is operable to both drive the saw and swing it transversely of the mast 34 so as to sever the tree 54 into logs 76 of a length corresponding substantially to the distance between the C-frame 32 and the saw 72. A stopper plate (not shown) which is described in detail in the aforementioned copending application is positioned in the C-frame 32 for halting the descent of the tree 54 at the C-frame 32. A log kicker mechanism 80 consisting of a log kicker 82 secured to an upright shaft 84 mounted on the C-frame 32 and a bracket 86 secured to the mast 34 is operable to move a severed log 76 rearwardly onto conveyor rollers 88 carried by the vehicle 12 which in turn move the log into the storage box 14. An actuating mechanism (not shown) in the C-frame 32 is operable to rotate the shaft 84 so as to swing the log kicker 82 in a clockwise direction, as viewed from above, so as to push a log 76 severed from the tree 24 onto the conveyor rollers 88.

Figure 2:
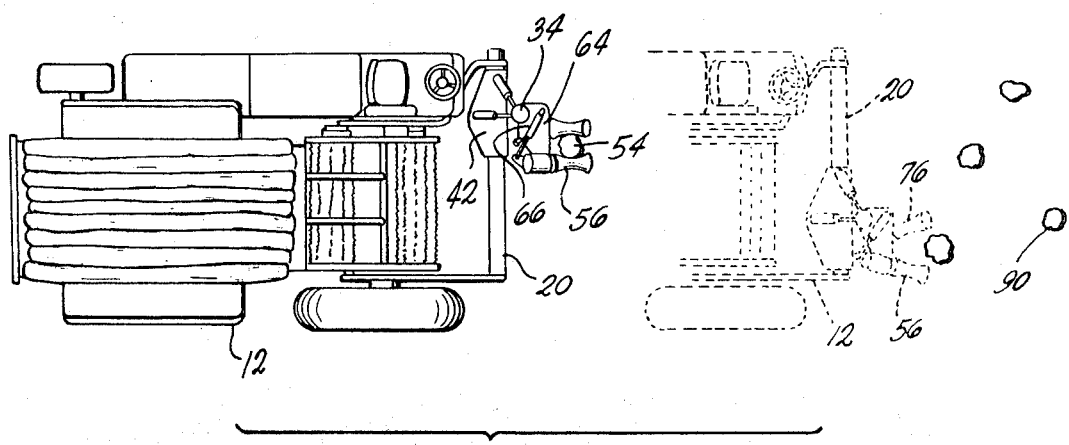
FIG. 2 is a plan view of the apparatus of FIG. 1 showing the apparatus in harvesting position in solid lines and in position preparatory to harvesting a tree in broken lines.

In the operation of the apparatus 10, an operator located in the cab 18 drives the vehicle 12 forwardly with the feeding and gripping rollers 56 in the release positions illustrated in broken lines in FIG. 2. By concurrently steering the vehicle 12 and operating the reversible motor 48 so as to move the slide assembly 42 longitudinally of the frame member 20, the operator aligns the C-frame 32 and the feeding and gripping assembly 36 with a tree 54 to be harvested. The combined action of the forward momentum of the vehicle 12 and the movement of the tree severing element 30 on the tree 54 operates to sever the tree 54 from the tree base without stopping the vehicle 12. The cylinder assemblies 26 can be adjusted to position the severing element 30 at a desired position relative to the ground surface. Also, the cylinder assemblies 52 can be adjusted to position the mast 34 with a tree 54 which is not exactly vertical. As soon as the tree 54 is positioned between the rollers 56, the cylinder assemblies 66 are operated to move the rollers 56 toward each other to the gripping position illustrated in FIG. 2 so that the motors 60 rotate the rollers 56 to start feeding the tree 54 downwardly. Simultaneously, the cutoff saw 72 cuts off a lower length of the tree 54 and the kicker 82 kicks the sawed-off log onto the conveyors 88. While this is taking place, a next section of the tree 54 is being fed downwardly until the lower end thereof hits the stopper plate (not shown) in the C-frame 32 and the cutoff saw 72 operates again to cut the tree 54 so as to form another log 76. This cycle is then continuously repeated while the vehicle 12 is moving to the next tree, such as the one indicated at 90 in FIG. 2 to be harvested, the entire first tree being converted into log lengths in the process.

From the above description it is seen that this invention provides tree harvesting apparatus which is capable of operating continuously so as to rapidly and efficiently convert a tree 54 into logs 76 stored on the vehicle 12.

I claim:

1. Apparatus for harvesting trees comprising a steerable forwardly movable vehicle, a tree felling and processing assembly located forwardly of said vehicle, said assembly including means for felling a tree and means for feeding a tree downwardly and cutting the tree into logs of predetermined length, frame means extending transversely of said vehicle at said forward end thereof, and support means secured to said assembly and movably mounted on said frame means for movement transversely of said vehicle to adjust the transverse position of said assembly.

2. Apparatus according to claim 1 wherein said frame means comprises a substantially horizontally extending frame member, rotatable screw means extending longitudinally of and mounted on said frame member, and nut means on said screw member and connected to said support means for said assembly.

3. Apparatus according to claim 2 wherein said assembly includes a lower C-frame, tree felling means on said C-frame and a mast mounted on and extending upwardly from said C-frame, means pivotally connecting said mast to said support means, and adjustable means connected to and extending between said support means and said mast and operable to incline said mast relative to a vertical plane.

4. Apparatus for harvesting trees comprising a vehicle having a forward end, tree felling means mounted on said forward end, a tree gripping and feeding assembly mounted on said forward end at a position above said severing means, said assembly comprising a plurality of gripping and feeding rollers arranged in vertically spaced pairs, the rollers in each of said pairs being generally cylindrical in shape and being horizontally spaced, each of said rollers having a concave surface, and each pair of rollers having the longitudinal axes thereof relatively reversely inclined so that said rollers are arranged crisscross fashion and are engageable with opposite sides of an upright tree.

5. Apparatus according to claim 4 further including means for moving said rollers toward and away from each other.

6. Apparatus according to claim 4 further including means resiliently urging said rollers toward each other.

7. Apparatus according to claim 4 further including an upright mast disposed in a relation with said felling means and said gripping and feeding assembly, tree-severing means on said mast disposed below said gripping and feeding assembly and above said severing means a predetermined distance.

8. Apparatus according to claim 7 further including tree-delimbing means mounted on said mast at a position above said tree gripping and feeding assembly.

9. Apparatus according to claim 7 further including means adjustably mounting said mast on said vehicle for movement to inclined positions and for movement transversely of the direction of vehicle movement.

10. Apparatus according to claim 7 further including log kicker means on said mast below said tree-severing means for moving a severed portion of a tree rearwardly onto said vehicle.

* * * * *